(12) United States Patent
Hellman et al.

(10) Patent No.: US 7,127,500 B1
(45) Date of Patent: Oct. 24, 2006

(54) RETRIEVAL OF DIGITAL OBJECTS BY REDIRECTION OF CONTROLLED VOCABULARY SEARCHES

(75) Inventors: Eric Sven Hellman, Montclair, NJ (US); Richard Miles Poindexter, Rutherford, NJ (US)

(73) Assignee: OCLC Online Computer Library Center, Inc., Dublin, OH (US)

( * ) Notice: Subject to any disclaimer, the term of this patent is extended or adjusted under 35 U.S.C. 154(b) by 0 days.

(21) Appl. No.: 09/437,378

(22) Filed: Nov. 10, 1999

(51) Int. Cl.
*G06F 15/16* (2006.01)

(52) U.S. Cl. .................. 709/219; 709/203; 709/228; 709/238; 709/246

(58) Field of Classification Search ............... 709/104, 709/217, 219, 203, 238, 246, 201, 202, 218, 709/228, 239, 242, 244
See application file for complete search history.

(56) References Cited

U.S. PATENT DOCUMENTS

| | | | | |
|---|---|---|---|---|
| 4,970,681 A | * | 11/1990 | Bennett ..................... 707/3 |
| 5,708,780 A | * | 1/1998 | Levergood et al. ......... 709/229 |
| 5,708,825 A | * | 1/1998 | Sotomayor | |
| 5,740,252 A | | 4/1998 | Minor et al. ................ 380/49 |
| 5,745,372 A | * | 4/1998 | Fluegge | |
| 5,819,092 A | * | 10/1998 | Ferguson et al. ............ 717/113 |
| 5,848,396 A | * | 12/1998 | Gerace ........................ 705/10 |
| 5,859,972 A | * | 1/1999 | Subramaniam et al. | |
| 5,870,546 A | | 2/1999 | Kirsch | |
| 5,895,461 A | * | 4/1999 | De La Huerga et al. | |
| 5,920,859 A | * | 7/1999 | Li ................................... 707/5 |
| 5,926,808 A | * | 7/1999 | Evans et al. | |
| 5,931,907 A | | 8/1999 | Davies et al. | |
| 5,933,490 A | * | 8/1999 | White et al. | |
| 5,948,061 A | | 9/1999 | Merriman et al. | |
| 5,963,915 A | * | 10/1999 | Kirsch ........................... 705/26 |
| 5,991,735 A | * | 11/1999 | Gerace | |
| 6,006,217 A | * | 12/1999 | Lumsden | |
| 6,009,410 A | | 12/1999 | LeMole et al. ............... 705/14 |
| 6,058,309 A | * | 5/2000 | Huang et al. | |
| 6,084,892 A | * | 7/2000 | Benash et al. | |
| 6,094,649 A | * | 7/2000 | Bowen et al. | |
| 6,112,239 A | * | 8/2000 | Kenner et al. .............. 709/224 |

(Continued)

FOREIGN PATENT DOCUMENTS

WO    WO 98/34189 A1    8/1998

OTHER PUBLICATIONS

"Report of the Second Workshop on Linkage from Citations to Journal Literature," Jun. 9, 1999.

(Continued)

*Primary Examiner*—Saleh Najjar
*Assistant Examiner*—Michael Y. Won
(74) *Attorney, Agent, or Firm*—Lahive & Cockfield, LLP (57) ABSTRACT

A controlled vocabulary abstract hyperlink is a variety of hyperlink that is directed to a redirection facility when selected. The hyperlink redirection facility is a redirection facility for directing the controlled vocabulary abstract hyperlink in a modified format to a service provider. The controlled vocabulary abstract hyperlink may be embellished and encapsulated in a "controlled vocabulary abstract hyperlink." The hyperlink redirection facility makes a determination of which service provider to use to service the request associated with the controlled vocabulary abstract hyperlink by examining user preferences, if any. The controlled vocabulary abstract hyperlink is then passed onto a service provider, which translates the request into an appropriate format for a selected service provider that has been identified by the hyperlink redirection facility. The service provider processes the request and returns results to the user.

31 Claims, 7 Drawing Sheets

U.S. PATENT DOCUMENTS

| | | | |
|---|---|---|---|
| 6,138,162 A * | 10/2000 | Pistriotto et al. | 709/229 |
| 6,141,010 A | 10/2000 | Hoyle | 345/356 |
| 6,144,988 A * | 11/2000 | Kappel | |
| 6,154,777 A * | 11/2000 | Ebrahim | 709/227 |
| 6,161,139 A * | 12/2000 | Win et al. | 709/225 |
| 6,170,017 B1 * | 1/2001 | Dias et al. | |
| 6,173,311 B1 * | 1/2001 | Hassett et al. | 709/202 |
| 6,209,038 B1 * | 3/2001 | Bowen et al. | |
| 6,226,752 B1 * | 5/2001 | Gupta et al. | 726/9 |
| 6,269,189 B1 * | 7/2001 | Chanod | 382/229 |
| 6,356,898 B1 * | 3/2002 | Cohen et al. | 707/5 |
| 6,567,857 B1 * | 5/2003 | Gupta et al. | 709/238 |
| 6,584,505 B1 * | 6/2003 | Howard et al. | 709/225 |
| 6,606,643 B1 * | 8/2003 | Emens et al. | 709/203 |
| 6,636,894 B1 * | 10/2003 | Short et al. | 709/225 |
| 6,760,758 B1 * | 7/2004 | Lund et al. | 709/217 |
| 6,775,687 B1 * | 8/2004 | Binding et al. | 709/203 |
| 6,779,118 B1 * | 8/2004 | Ikudome et al. | 713/201 |
| 6,954,799 B1 * | 10/2005 | Lerner | 709/240 |

OTHER PUBLICATIONS

Okerson, Ann, "Wiley Licensing Changes," liblicense listserve, Jul. 8, 1999.

"PROLA: More Than Just a Pretty Acronym," APS News, Aug./Sep. 1999 edition.

Van de Sompel, Herbert, et al., "Reference Linking in a Hybrid Library Environment Part 1: Frameworks for Linking," D-Lib Magazine, vol. 5, No. 4, Apr. 1999.

Van de Sompel, Herbert, et al., Reference Linking in a Hybrid Library Environment Part 2: SFX, a Generic Linking Solution, D-Lib Magazine, vol. 5, No. 4, Apr. 1999.

Van de Sompel, Herbert, et al., "Reference Linking in a Hybrid Library Environment Part 3: Generalizing the SFX Solution in the *SFX@Ghent* & *SFX@LANL* Experiment," D-Lib Magazine, vol. 5, No. 10, Oct. 1999.

Program from TICER Summer School on Digital Libraries, Aug. 11, 1998.

Caplan, Priscilla, et al., "Reference Linking for Journal Articles," D-Lib Magazine, vol. 5, No. 7/8, Jul./Aug. 1999.

Caplan, Priscilla, et al., "Choosing the Appropriate Copy, Report of a Discussion of Options for Selecting the Among Multiples Copies of an Electronic Journal Article," Digital Library Federation, Architecture Committee, Sep. 1999.

Van de Sompel, Herbert, "Extended Services in a Hybrid Library Environment," Second Workshop on Linkage from Citations to Electronic Journal Literature, Jun. 9, 1999.

Carr, L. A. et al. "Link Services of Link Agents?" The 9th ACM conference on Hypertext and Hypermedia. Pittsburgh, Pa.. Jun. 20, 1998. pp. 113-122.

De Roure, D. et al. "A distributed hypermedia link service" Proceedings of Third International Workshop on Macau. Jun. 3, 1996. pp. 156-161.

De Roure, D. et al. "Enhancing the Distributed Link Service for multimedia and collaboration" Proceedings of the Sixth IEEE Comput. Soc, US. Oct. 29, 1997 pp. 330-335.

De Roure, D. et al. "Integration of diverse hypermedia link servers using request routing" Proceedings. Tenth International Workshop on Florence, Italy. Sep. 1-3, 1999. pp. 667-671.

The Digital Object Identifier System, sponsored by the International DOI Foundation, last updated Feb. 14, 2000 [retrieved on Feb. 15, 2000]. Retrieved from the Internet: http://www.doi.org/.

A Proposal for Linking from PubMed to Document Providers, National Library of Medicine, last modified Jul. 9, 1999 [retrieved on Feb. 15, 2000]. Retrieved from the Internet: http://www.ncbi.nih.gov/PubMed/linkout.html.

Sollins, K. et al., Functional Requirements for Uniform Resource Names, Network Working Group, Request for Comments, Dec. 1994 [retrieved on Feb. 15, 2000]. Retrieved from the Internet: http://www.cis.ohio-state.edu/htbin/rfc/rfc1737.html.

Van de Sompel, H. and Hochstenbach, P., Reference Linking in a Hybrid Library Environment: part 2: SFX, a Generic Linking Solution, D-Lib Magazine, vol. 5, Issue 4, Apr. 1999 [retrieved on Feb. 15, 2000] Retrieved on the Internet: http://www.dlib.org/dlib/april99/van_de_sompel/04van_de_sompel-pt2.html.

* cited by examiner

```
<html>
<read>
<title> Example Document </title>
</head>
<body>
Here is an example document with a
60~<a href="http://think.openly.com/servlet/Search Baton?Stock Symbol=
62~   rhat">RHAT </a>
</body>
</html>
```

RETRIEVAL OF DIGITAL OBJECTS BY REDIRECTION OF CONTROLLED VOCABULARY SEARCHES

TECHNICAL FIELD

The present invention relates generally to data processing systems and more particularly to the retrieval of digital objects by redirection of controlled vocabulary searches.

BACKGROUND OF THE INVENTION

Services for providing digital content may generally be classified into two categories: subscription-based or non-subscription-based. With subscription-based services, the user must first subscribe to the service, which often entails payment of a subscription fee or payment on a per use basis. The content provided by subscription-based services may vary and may include contents such as journal articles, databases, financial information and the like.

Non-subscription-based services do not require that a user have a subscription in order to access information provided by the service. Search engines, such as those provided by Yahoo and Netscape, are examples of non-subscription based services. A user may submit a request to the search engine and receive search results that contain a number of hyperlinks to content available on the Internet without having a subscription.

One current difficulty facing users is that content provided by subscription-based services and content provided by non-subscription based services are distinct and must be queried separately. For example, if a user is interested in information about astronauts, the user must first submit a query to the subscription-based service to obtain search results. Subsequently, the user must submit a separate query to the non-subscription-based service.

Another difficulty concerns hyperlinks within documents. A hyperlink within a document works well so long as the reader of the document has access to the content referenced by the hyperlink. Difficulties may arise where the hyperlink references content that is not accessible to the reader. In many instances, the hyperlink refers purely to content that is freely accessible and, thus, is unduly limiting in its scope.

SUMMARY OF THE INVENTION

The present invention provides a mechanism for a hyperlink to be resolved based on user preference to retrieve digital objects. For example, a hyperlink may reference documents regarding Thomas Edison. If the user that clicks on the hyperlink has access to both subscription-based services and non-subscription based services, the user determines which of the services is to be used in resolving the hyperlink to one or more resources. On the other hand, where a user does not subscribe to a subscription-based service, the hyperlink may be resolved by non-subscription-based services when the user clicks on the hyperlink. Thus, in one embodiment, the present invention provides a mechanism for resolving a hyperlink to one or more resources based upon user preference. This enables a hyperlink to be resolved differently based upon whether the user has access to subscription-based services and/or non-subscription-based services.

In one embodiment, the present invention provides a controlled vocabulary that is used to specify a unique variety of hyperlink. The hyperlink contains a uniform resource locator (URL). The URL is not for a service provided to resolve the hyperlink, but rather refers to a hyperlink redirection facility. The hyperlink redirection facility contains information regarding user preferences for resolution services. Alternatively, the hyperlink redirection facility may query the user for preferred resolution service. The hyperlink redirection facility redirects link information and user information to a service provider facility in accordance with user preference. The service provider receives the user information and the link information and directs the information to a service provider that provides resources, such as search results. The resources are then returned to the user by the service provider.

In accordance with one aspect of the present invention, a method is practiced in an environment that has a redirection facility. In accordance with this method, a user requests to access information regarding a semantic value that is associated with a hyperlink. The semantic value is a value that pertains to the meaning of the hyperlink. The semantic value may take different forms, such as a keyword, descriptive term, or identifier, a database key or other value associated with the hyperlink. The request is received at the redirection facility. A user preference is identified regarding which service provider to use to service the request. Based on the user preference, the request is directed from the redirection facility to a service provider for servicing the request.

In accordance with a further aspect of the present invention, user information regarding a user and link information regarding a hyperlink to be resolved to a resource in response to the user selecting the hyperlink are received in an electronic device. A resolution service is identified for employment to resolve the hyperlink based on the user information. At least some of the link information is forwarded to the identified resolution service for resolution of the hyperlink.

In accordance with an additional aspect of the present invention, a request for a resource is received in a computer system. The request originates from a user selecting a hyperlink, and the request is redirected to the computer system by an intermediary. The request is translated into a format that is acceptable to the computer system and the request is serviced by returning a resource to the user.

In accordance with a further aspect of the present invention, a search query is received that originates from a user. Where the user subscribes to a service that provides access only to subscribers, a search is conducted in accordance with a search query on the content that is accessed via the service. The results of the search are returned to the user.

In accordance with a still further aspect of the present invention, a method of advertising is practiced in an environment that has a redirection facility for redirecting a selected request from a requestor for a given resource to a service provider. The selected request is received at the redirection facility. A criterion is examined, and based on the examined criterion, a determination is made whether to present an advertisement to the requestor.

BRIEF DESCRIPTION OF THE DRAWINGS

An illustrative embodiment of the present invention will be described below relative to the following drawings.

DETAILED DESCRIPTION OF THE INVENTION

The illustrative embodiment provides a unique approach to resolving hyperlinks. The illustrative embodiment uses three major components in the resolution of hyperlinks. These three major components are a controlled-vocabulary abstract hyperlink, a hyperlink redirection facility and a translation facility for directing a request originating from selection of the hyperlink to a service provider. The controlled vocabulary abstract hyperlink is constructed using a controlled vocabulary and contains a URL that directs a request resulting from the selection of the hyperlink to a hyperlink redirection facility. The hyperlink redirection facility receives the request along with cookies containing information regarding the user and determines where to redirect the request. The hyperlink redirection facility may maintain information regarding user preferences for which services to use in resolving a hyperlink. The hyperlink redirection facility then passes a controlled vocabulary abstract hyperlink to the user for forwarding to a service provider. The controlled vocabulary abstract hyperlink is a structured information request. The service provider receives the controlled vocabulary abstract hyperlink and translates the request into a format suitable for the selected service provider via a translation facility. The service provider then forwards the translated request to the selected service, which returns a resource, such as a web page containing search results to the user.

The illustrative embodiment exploits both link abstraction and link indirection. The illustrative embodiment exploits link abstraction in that a link refers to an abstract grouping of resources. For illustrative purposes in the discussion below, it is presumed that the link is for a search. The search can return documents that did not exist at the time that a hyperlink was authored. The illustrative embodiment uses controlled vocabulary link construction such that a particular data object may be assembled in specified ways using formula and algorithms. The illustrative embodiment uses link indirection in that the link initially points to the hyperlink redirection facility and then is redirected to a service provider.

In some instances, the service provider to which the hyperlink redirection facility passes the request may not have content to return to the user. In such a case, the illustrative embodiment identifies a next service provider to use and submits the request to the next service provider. This helps to ensure that the user is provided meaningful and useful results from the request.

The illustrative embodiment may also entail an advertising method. The hyperlink redirection facility may determine a number of times that a given user has requested resources. At periodic intervals, the hyperlink redirection facility may present an advertisement to the user. Moreover, the advertisement may change depending upon the number of times the advertisement has been presented to the user. The advertisement may be chosen based on a random criterion, the target service provider, the date that an advertisement was last sent to the user or other criteria. The advertisement may be presented to the user by presenting a web page containing the advertisement. The advertisement may include both video content and audio content.

The illustrative embodiment provides a powerful tool for the use of hypertext. A single hyperlink may be resolved in two different fashions for different users. The hyperlink may be resolved to subscription-based services as well as non-subscription-based services. Moreover, the hyperlink may be resolved based on user preference.

The illustrative embodiment facilitates change without requiring the modification of a hyperlink. The abstract link contained within a document need not be updated rather the hyperlink redirection facility and service provider may modify the resolution of the link to a concrete link.

Figure 1:
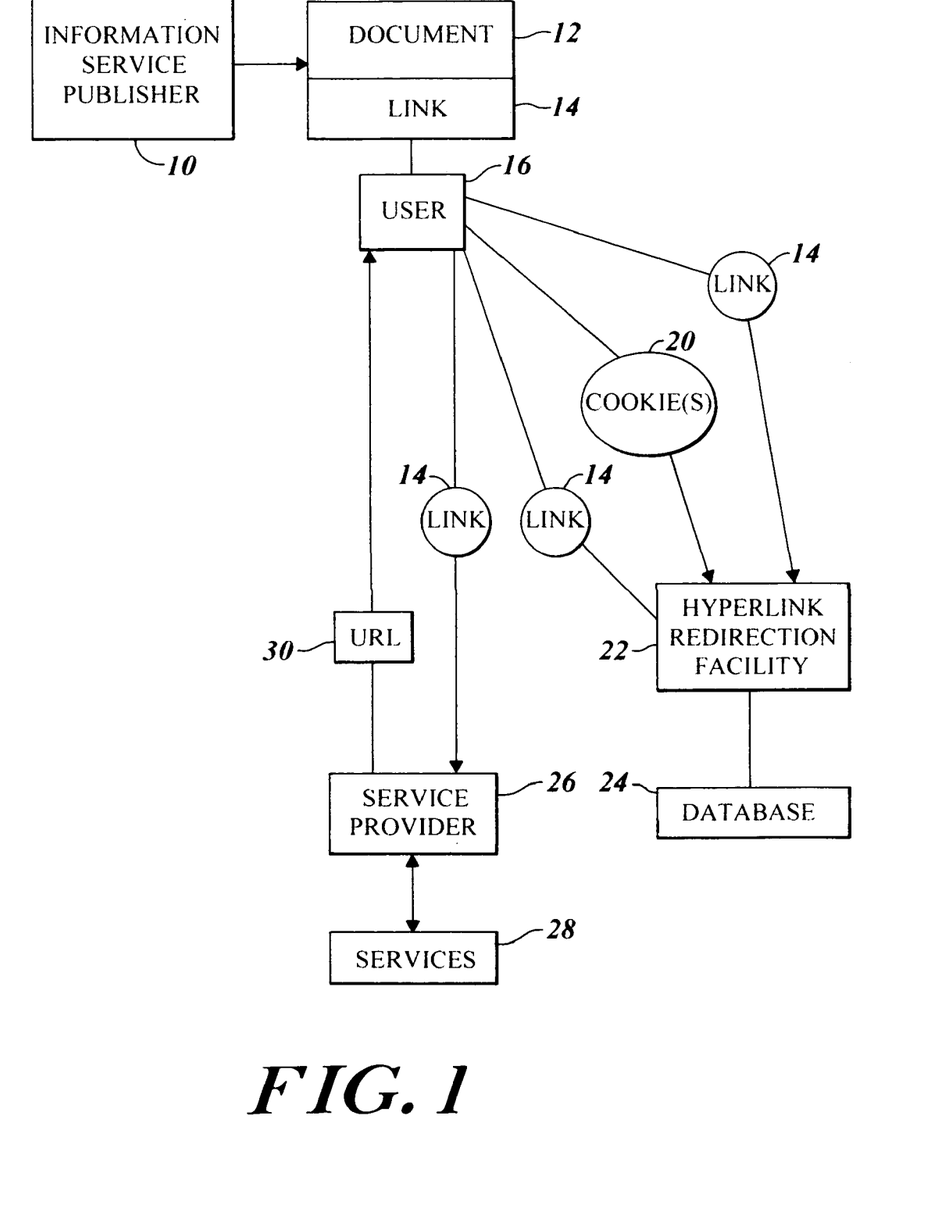
FIG. 1 is a block diagram illustrating components and data flow in the illustrative embodiment of the present invention.

FIG. 1 depicts a block diagram of components in the illustrative embodiment of the present invention. The information service publisher 10 provides a document 12 that includes a controlled vocabulary abstract hyperlink 14 ("Link" in FIG. 1). The controlled vocabulary abstract hyperlink 14 is the special variety of hyperlink used in the illustrative embodiment. The information service publisher 10 may be any of a number of different publishers that provides digital objects that are accessible via a network, such as the Internet, an intranet, an extranet or other type of network. Although the controlled vocabulary abstract hyperlink 14 is depicted in FIG. 1 as being part of a document 12, those skilled in the art will appreciate that more generally, there is just the need for the controlled vocabulary abstract hyperlink 14 to be embedded in some form of content. A user 16 accesses the document and may select the controlled vocabulary abstract hyperlink 14 by directing a mouse cursor to point at the controlled vocabulary abstract hyperlink and clicking a button on the mouse. The user 16 is presumed to have a computer system or other electronic device that allows the user access to the document 12. The user has a connection with a hyperlink redirection facility 22.

The hyperlink redirection facility 22 is an intermediary redirection facility that may be implemented in software on a computer system or other electronic device. The device may support the TCP/IP protocol suite and may be part of a network, including but not limited to the Internet, an intranet or an extranet. The hyperlink redirection facility 22 may run on a dedicated server, such as a web server 22. Those skilled in the art will appreciate that multiple hyperlink redirection facilities may be present in a system for practicing the present invention. For example, multiple hyperlink redirection facilities may be operating in parallel. Moreover, multiple hyperlink redirection facilities may be found where a service provider uses such a facility in resolving an abstract hyperlink. Other configurations with multiple hyperlink redirection facilities are also possible. For purposes of simplicity, only a single hyperlink redirection facility 22 is depicted in FIG. 1. A service provider 26 serves as the "front end" for receiving requests, translating requests, and passing the request onto services 28. The service provider may be something as simple as a web site. The service provider may run as a facility on a dedicated server. The remaining components depicted in FIG. 1, will be described in more detail below relative to discussion of the flow chart of FIG. 2.

Figure 2:
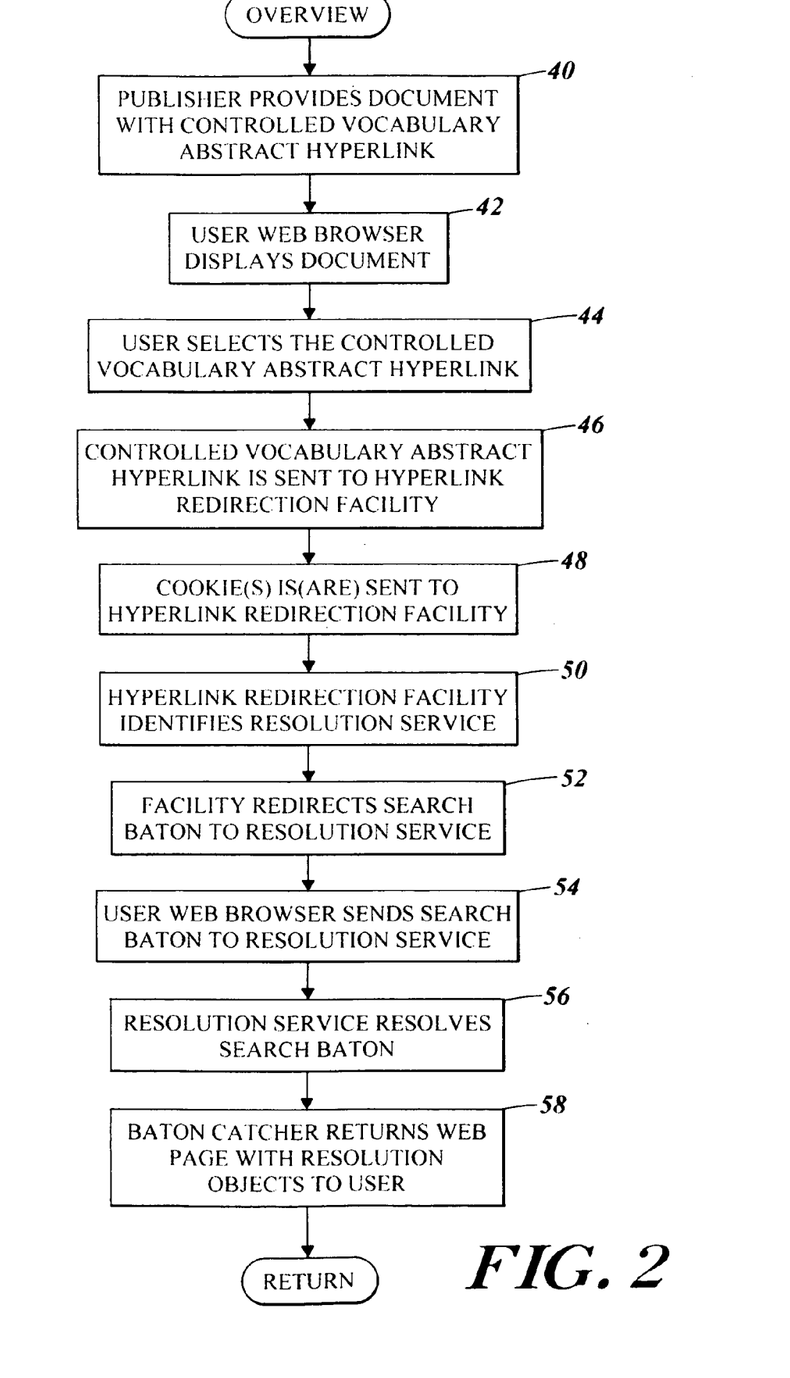
FIG. 2 is a flow chart that provides an overview of the steps performed in the illustrative embodiment.

FIG. 2 provides an overview of the steps performed in the illustrative embodiment of the present invention to resolve a hyperlink. Initially, the information service publisher 10 provides a document 12 that contains a controlled vocabulary abstract hyperlink 14 (step 40 in FIG. 2). the illustrative embodiment requires that the controlled vocabulary abstract hyperlink 14 be specified in accordance with a schema or controlled vocabulary that describes information items. In order to appreciate the controlled vocabulary that is employed in the illustrated embodiment, it is helpful to consider an example. Suppose that an Internet publisher imbeds a controlled vocabulary abstract hyperlink 14 which specifies a search for information related to an author names "Wendy Jones." The controlled vocabulary uses the "Genre," "author," and person name "Wendy Jones." The URL contained within the controlled vocabulary abstract hyperlink 14 points to a hyperlink redirection facility. The controlled vocabulary are meta data is used by the hyperlink redirection facility as will be described in more detail below.

The information service publisher 10 may, for example, place the document 12 on a web server that is accessible to a user 16 that runs a web browser. The user web browser displays the document 12 on a display device, such as a video display (step 42 I FIG. 2). The user 16 then selects the controlled vocabulary abstract hyperlink 14 (step 44 in FIG. 2). As mentioned above, the user 16 may select the controlled vocabulary abstract hyperlink 14 by positioning a mouse cursor to point at the link within the then document 12 and then clicking a mouse button. Those skilled in the art will appreciate that there may be other mechanisms for selecting the controlled vocabulary abstract hyperlink 14.

Figure 3:
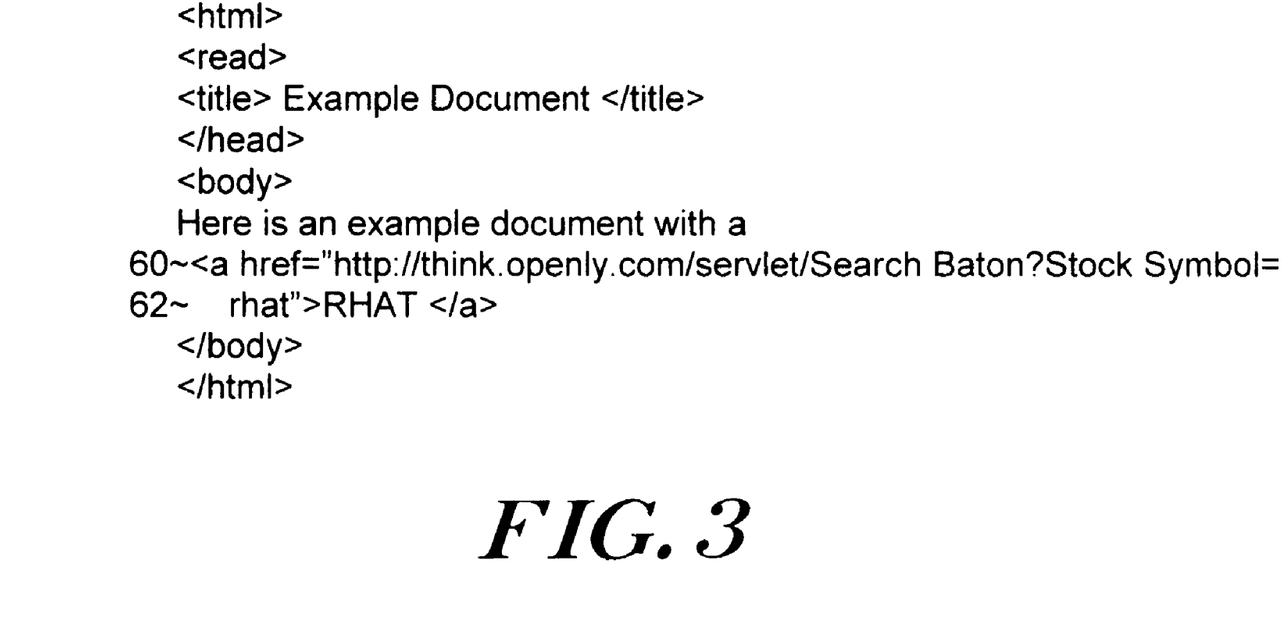
FIG. 3 depicts an example of an HTML document used in the illustrative embodiment.

A controlled vocabulary abstract hyperlink 14 is then passed to the hyperlink redirection facility 22. This differs from conventional systems in that when a hyperlink is selected in a conventional system, an HTTP request is sent to the designated URL for resolution. The controlled vocabulary abstract hyperlink 14 contains meta data and a URL that points to the hyperlink redirection facility 22. FIG. 3 depicts an example hypertext markup language (HTML) document that contains a controlled vocabulary abstract hyperlink 14. The document 12 contains the typical tags found in an HTML document, including a <HTML> tag pair, a <head> tag pair, a <title> tag pair and a <body> tag pair. The controlled vocabulary abstract hyperlink 14 is specified as shown on lines 60 and 62 as a hyperlink that contains a URL for the hyperlink redirection facility 22. For the example depicted in FIG. 3, it is presumed that the controlled vocabulary abstract hyperlink is for a portion of hypertext that identifies a stock ticker symbol "RHAT".

Figure 4:
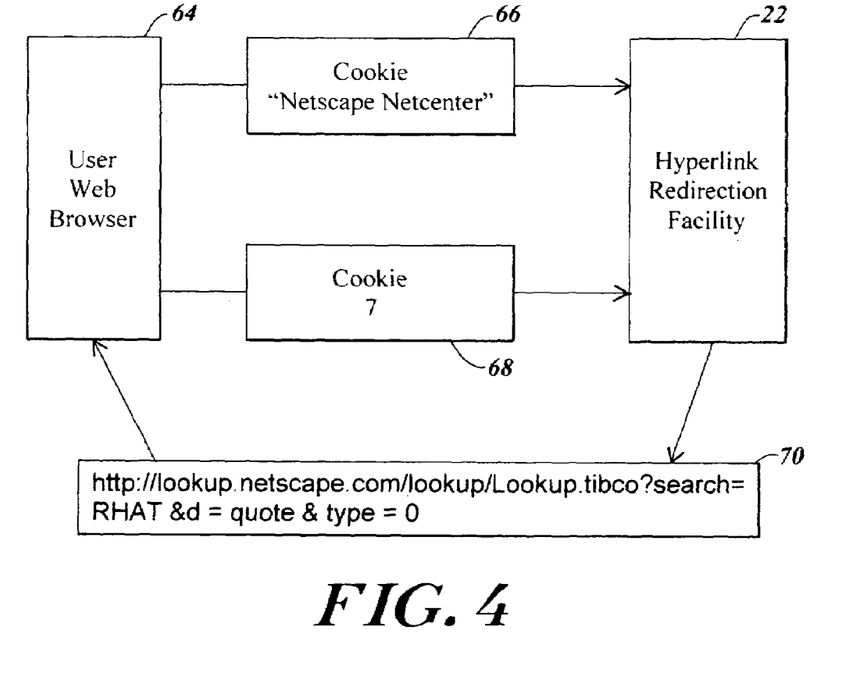
FIG. 4 illustrates data flow between the user web browser and a hyperlink redirection facility.

One or more cookies 20 are sent from the user web browser (see 16 in FIG. 1) to the hyperlink redirection facility 22 (step 48 in FIG. 2). The cookies are data structures that hold context information. In the present context, the term "cookie" refers to a structure as defined in the cookie specification developed by the HTTP working Group of the Internet Engineering Task Force (IETF) in RFC 2109. The cookies 20 may contain user information and link information. The user information may include information regarding the user and the user preferences regarding resolution services to use in resolving the controlled vocabulary abstract hyperlink 14. The cookies 20 may also contain information regarding the number of times that the user has submitted a request to the hyperlink redirection facility 22. The user 16 has submitted a request to the hyperlink redirection facility 22. FIG. 4 shows an example. The user web browser 64 sends a first cookie 66 that identifies that the user would like to use Netscape NetCenter to resolve the controlled vocabulary abstract hyperlink 14. Resolution entails providing resources in response to a request to get resources at a specified URL. The user web browser 64 also sends a second cookie 68 that contains information regarding the number of times that the user has submitted a request to the hyperlink redirection facility 22. In the example depicted in FIG. 4, the user has submitted seven requests to the hyperlink redirection facility 22. As will be described in more detail below, the information regarding the number of times the user has submitted requests to the hyperlink redirection facility 22 may be used to guide handling of the controlled vocabulary abstract hyperlink 14 and to determine whether to provide advertising to the user.

The hyperlink redirection facility 22 identifies a resolution service to use in servicing the requests associated with the controlled vocabulary abstract hyperlink 14 (step 50 in FIG. 2). The resolution service may be identified within the cookies, such as cookie 66 in FIG. 4 or may be identified in a database 24 that contains information regarding user preferences. The user preferences may be prioritized or may contain multiple resolution services in some instances.

The hyperlink redirection facility 22 then redirects the URL (see 70 in FIG. 4) for the appropriate resolution service or services to the identified resolution service or services (step 52 in FIG. 2). As shown in FIG. 1, the URL 70 is passed back to the user web browser. FIG. 4 shows an example wherein a URL is returned for submitting a stock ticker quote request for RHAT from the Netscape NetCenter service.

The user web browser sends the controlled vocabulary abstract hyperlink 14 to the resolution service, i.e. the service provider 26 (step 54 in FIG. 2). The service provider 26 provides a framework in which a service, such as a library, can make information services available to customers based on links to information items. The service provider 26 receives a structured information request in the form of a controlled vocabulary abstract hyperlink 14 and responds with requested information. The response may take many forms and may take the form of URL 30 as shown in FIG. 1. The service provider 26 uses templates to construct the URL that is passed back to the user browser. The URL strings are formed by filling in blanks in templates. For example, consider a journal article with a web site at http://www.publisher.com/. This journal has articles that have URLs based on volume and page such as shown in Table 1.

| Volume | Start Page | URL |
|--------|-----------|-----|
| 3 | 25 | http://www.publisher.com/003/25/ |
| 10 | 485 | http://www.publisher.com/010/485/ |

The template is as follows.

```
<?xml version="1.0">
<!DOCTYPE S-Link-S SYSTEM "S-Link-S.dtd">
<S-Link-S ID="example">
<URL>http://www.publisher.com/<pad padChar="0" length="3">
&volume;</pad>/&startpage;/</URL>
</S-Link-S>
```

For the example template document, "&startPage;" and "&volume;" are placeholders or blanks for the starting page number and the volume number, respectively. These placeholders are filled in with actual values to create a URL. The "<pad>" tag indicates that padding 0's need to be added to make fixed-length strings. The service provider 26 has templates available and uses the meta data passed from the controlled vocabulary abstract hyperlink 14 to construct the URL that is returned.

Figure 5:
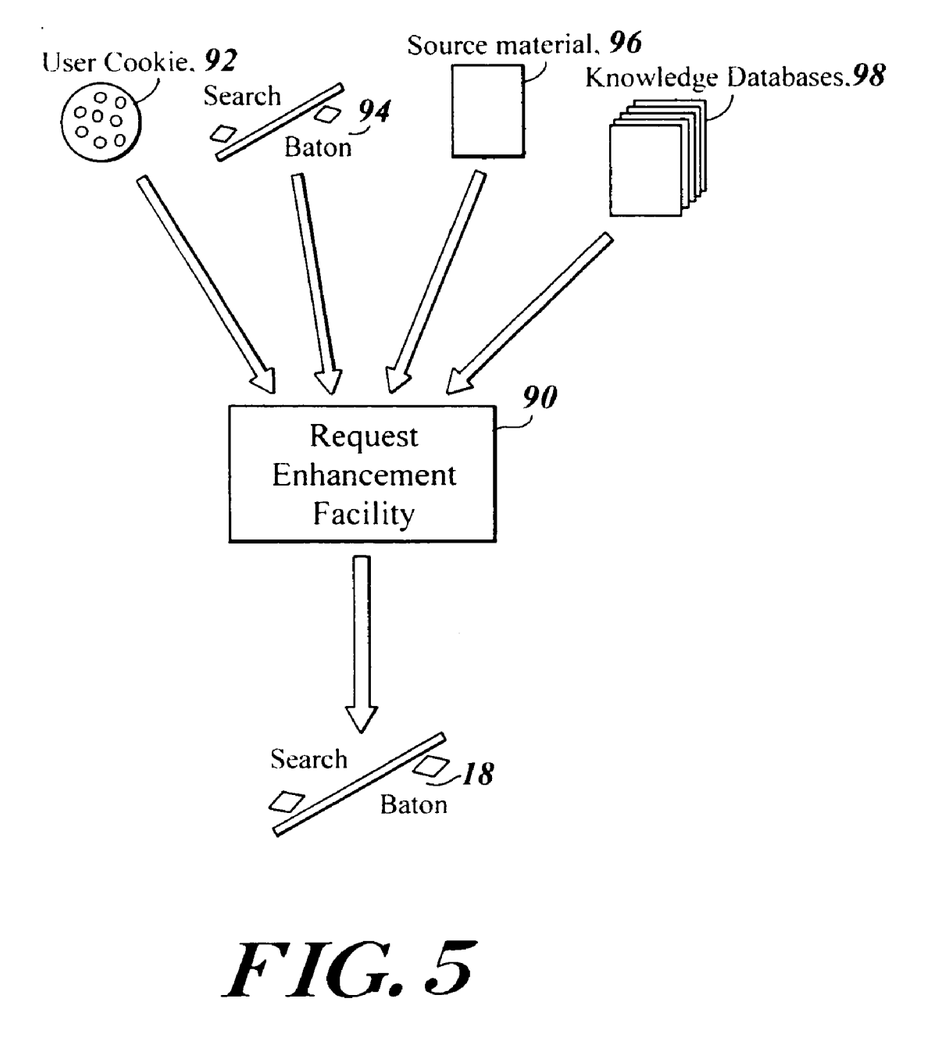
FIG. 5 depicts an example of a request enhancement facility.

In some instances it may be useful to add additional information to the controlled vocabulary abstract hyperlink 14 so as to enhance the results that are returned by a service provider 26. A request enhancement facility 90 (FIG. 5) serves the function of embellishing the controlled vocabulary abstract hyperlinks. As shown in the example in FIG. 6, the request enhancement facility 90 may add information from the user cookie 92, another controlled vocabulary abstract hyperlink 94, source Material 96 or knowledge databases 98 for inclusion in the controlled vocabulary abstract hyperlink 14. One example of the use of a request enhancement facility 90 is the inclusion of ISSN numbers. Although an ISSN number is not particularly interesting to a user, a ISSN number may greatly enhance the nature of a query that is submitted.

In the above-described fashion, the resolution service resolves the controlled vocabulary abstract hyperlink (step 56 in FIG. 2). For the example set forth above where a URL is returned for submitting a stock ticker quote request from a service, the service provider has a template for the stock symbol request from Netscape NetCenter is http://lookup.netscape.com/lookup/Lookup.tibco?search=<symbol>&d=quote&type=0. The tag <symbol> in the template is replaced with RHAT by the resolution service to produce the URL that is returned to the user. The service provider 26 then returns a URL or other content with resolution objects to the user 16 (step 58 in FIG. 2).

The controlled vocabulary abstract hyperlink 14 may serve as a type of genre selector. The "genre" refers to the kind of content being retrieved (e.g. journal articles, database records, books, etc.). For example, an ISBN value and a ticker symbol value may get resolved using a different set of preferences as they represent two different genres. The stock ticker symbol may be resolved by a financial service publisher and the ISBN value may be resolved by a technical journal publisher. Different preferences may be associated with the use of the respective service providers.

Figure 6:
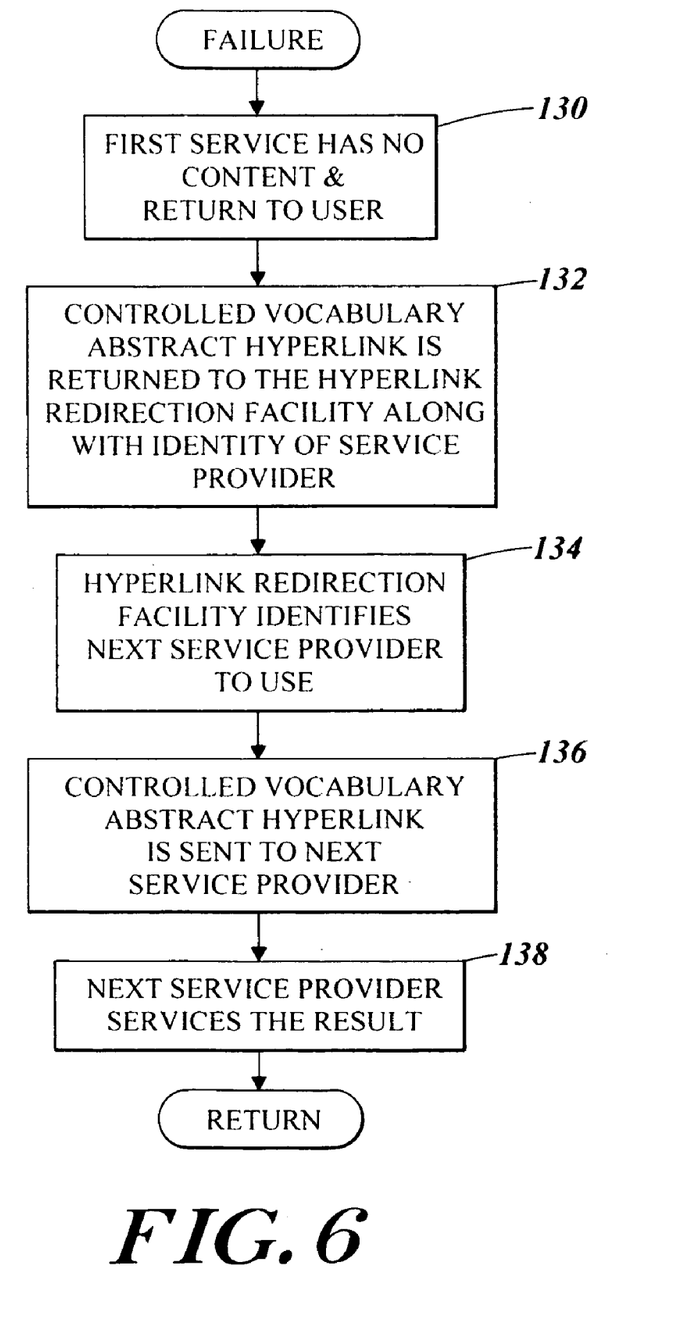
FIG. 6 illustrates the steps that are performed when a service provider does not have any content to provide to a user.

As was mentioned above, in some instances, the resolution service to which the controlled vocabulary abstract hyperlink 14 is passed may not provide content or may not have any content that satisfies the request encapsulated in the controlled vocabulary abstract hyperlink 14. The illustrative embodiment provides a mechanism for a second chance for resolving a controlled vocabulary abstract hyperlink 14. FIG. 6 is a flow chart illustrating the steps that are performed in such an instance. Initially, the first service has no content to return to the user 16 (step 130 in FIG. 6). The controlled vocabulary abstract hyperlink 14 is then returned to the hyperlink redirection facility 22 along with information to identify the service provider that failed to resolve the hyperlink (step 132 in FIG. 6). The hyperlink redirection facility 22 then identifies the next service to utilize (step 134 in FIG. 6). The controlled vocabulary abstract hyperlink is sent to the next service provider (step 136 in FIG. 6), and the next service provider services the request (step 138 in FIG. 6). Those skilled in the art will appreciate that such iterations may go more than two levels deep such that if the second service provider fails, a third service provider is used and if the third service provider fails a fourth service provider is used, and so on.

Figure 7:
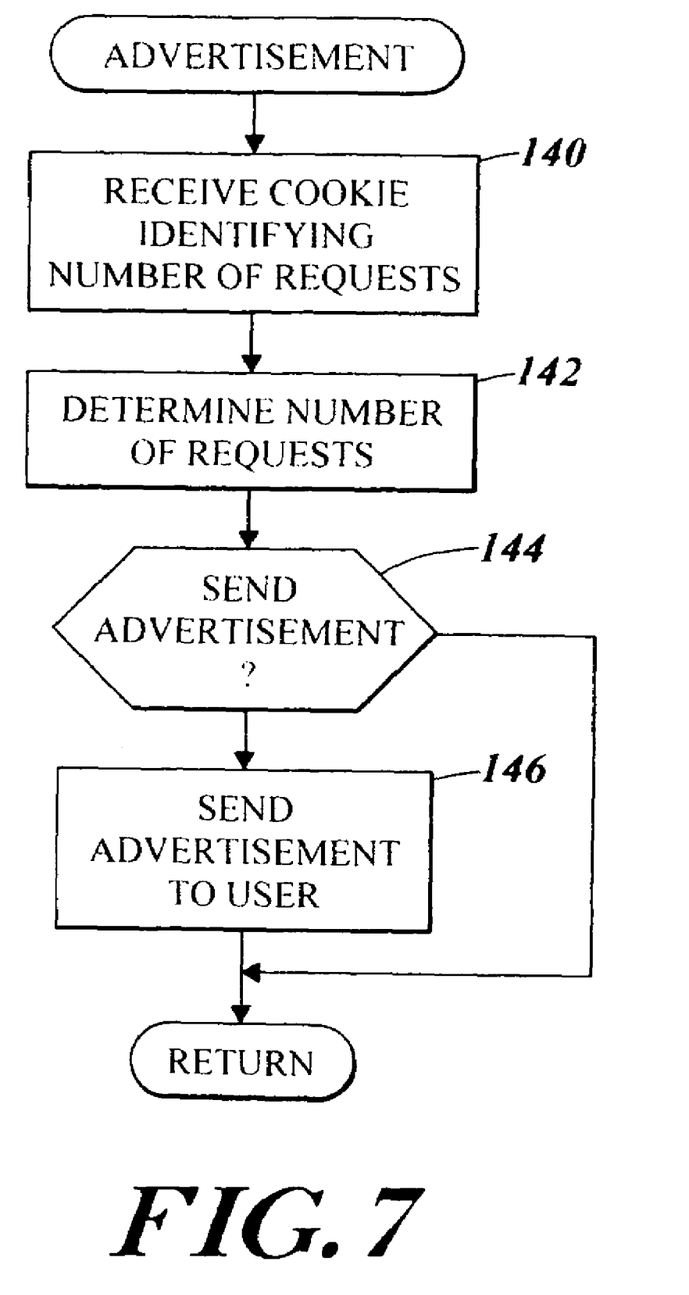
FIG. 7 is a flow chart illustrating steps that are performed in accordance with an advertisement method of the illustrative embodiment of the present invention.

The illustrative embodiment also provides a mechanism for performing advertisement. FIG. 7 is a flow chart illustrating the steps that are performed in accordance with this method. Initially, the cookie 68 identifying the number of requests that have been services by the hyperlink redirection facility for the user is received by the hyperlink redirection facility (step 140 in FIG. 8). The hyperlink redirection facility 22 extracts this information from the cookie to determine the number of requests that have been submitted by the user (step 142 in FIG. 8). The hyperlink redirection facility 22 may use a number of different criteria to determine whether to send an advertisement and if so, what advertisement to send. The hyperlink redirection facility 22 may examine the number of times the user has used the hyperlink redirection facility, when the user last used the hyperlink redirection facility, the identity of the targeted service, random criteria or other criteria. The hyperlink redirection facility 22 makes a determination whether to present an advertisement to the user based on the examined criteria (step 144 in FIG. 8). Where a decision is made to send the advertisement, the appropriate information is sent to the user (step 146 in FIG. 8). The sending of the advertisement may entail sending a web page that contains an advertisement to the user. The advertisement may include both audio and video content. The criteria may also be used to determine which of multiple advertising choices are sent to the user.

While the present invention has been described with reference to an illustrative embodiment thereof, those skilled in the art will appreciate that various changes in form and detail may be made without departing from the intended scope of the present invention as defined in the appended claims.

The invention claimed is:

1. A method for processing user requests in a network, comprising the steps of:

processing selectively user requests to access information, the selective processing directing a request originating from a user selection of a controlled vocabulary abstract hyperlink to a hyperlink redirection facility, said controlled vocabulary abstract hyperlink including a semantic value and an URL (Uniform Resource Locator) address of the hyperlink redirection facility, said semantic value being at least one of a descriptive term and an identifier for the requested information, said hyperlink redirection facility being an intermediary performing redirection of said request and having more than one possible target profile for each request, said selective processing further directing a user request originating from a user selection of a hyperlink not including an URL of the hyperlink redirection facility directly to a requested resource without first directing the request to the hyperlink redirection facility;

receiving at the redirection facility a communication from the user contemporaneously with or following the receipt of the user request to access information originating from the selection of the controlled vocabulary abstract hyperlink;

identifying, the identification based on the information in the received communication, a user-supplied preference regarding which service provider to use to service the request, said user-supplied preference being identified at the hyperlink redirection facility prior to any communication being sent from the hyperlink redirection facility or server to the user soliciting said preference; and directing the request originating from the selection of the controlled vocabulary abstract hyperlink from the redirection facility to a user for forwarding to a service provider for servicing the request based on the user-supplied preferences.

2. The method of claim 1, wherein the communication holds information about the user.

3. The method of claim 1, wherein the communication comprises a cookie.

4. The method of claim 1, wherein the redirection facility has access to a database holding data regarding preferences of users and wherein the step of identifying the user preference further comprises accessing the database to access the data.

5. The method of claim 1, wherein the method further comprises the steps of:
   wherein the service provider fails to fully service the request originating from the selection of the controlled vocabulary abstract hyperlink, identifying a second service provider to use to service the request and directing the request from the redirection facility to the second service provider to service the request.

6. In an environment having a redirection facility, a method, comprising the steps of:
   processing selectively a user request to access information, the selective processing directing a request originating from a user selection of a hyperlink that includes a reference to a hyperlink redirection facility and a semantic value associated with the hyperlink to the hyperlink redirection facility, said semantic value being at least one of a descriptive term and an identifier for the requested information, said selective processing further directing a user request originating from a user selection of a hyperlink not including a reference to the hyperlink redirection facility directly to a requested resource without first directing the request to the hyperlink redirection facility;
   receiving at the hyperlink redirection facility a communication from the user contemporaneously with or following the receipt of the user request to access information originating from the user selection of the hyperlink including the reference to the hyperlink redirection facility;
   identifying, the identification based on the information in the received communication, a user-supplied preference regarding which service provider to use to service the request, said user-supplied preference being identified at the redirection facility prior to any communication being sent from the redirection facility to the user soliciting said preference;
   directing the request originating from the user selection of the hyperlink including the reference to the hyperlink redirection facility from the hyperlink redirection facility to the user for forwarding to a service provider for servicing of the request, said request modified based on the user-supplied preferences;
   identifying a second service provider to use to service the request originating from the user selection of the hyperlink including the reference to the hyperlink redirection facility and directing the request from the hyperlink redirection facility to the user to for forwarding to the second service provider for servicing of the request when the service provider fails to fully service the request; and
   identifying the service provider that failed to fully service the request at the hyperlink redirection facility before the direction of the request to the user for forwarding to the second service provider.

7. A method for processing user requests, comprising the steps of:
   processing selectively user requests to access information, the selective processing resolving a request generated by a user selection of a controlled vocabulary abstract hyperlink by directing the request to a hyperlink redirection facility, the request including link information associated with the link, the hyperlink redirection facility receiving user-supplied information regarding a user contemporaneously with or following the receipt of the link information, said link information including a semantic value and an URL (Uniform Resource Locator) address of said hyperlink redirection facility, said semantic value being at least one of a descriptive term and an identifier for the resource, said redirection facility being an intermediary performing redirection of said request and having more than one possible target profile for each request, said selective processing further directing a user request originating from a user selection of a hyperlink not including an URL address of the hyperlink redirection facility directly to a requested resource without first directing the request to the hyperlink redirection facility;
   identifying a resolution service to employ to resolve the controlled vocabulary abstract hyperlink based on the user-supplied information, said user-supplied information being received at the hyperlink redirection facility prior to any communication being sent from the hyperlink redirection facility to the user soliciting said information; and
   forwarding at least some of the link information via said requesting user to the identified resolution service for resolution of the controlled vocabulary abstract hyperlink.

8. The method of claim 7, wherein the step of receiving the user-supplied information comprises receiving a cookie.

9. The method of claim 7, wherein the step of identifying the resolution service for resolving the request generated by the selection of the controlled vocabulary abstract hyperlink comprises accessing data regarding services available to the user and identifying the resolution service based on services available to the user.

10. The method of claim 7, wherein the method for processing user requests is performed by a computer system.

11. The method of claim 7, wherein the method further comprises the steps of:
    wherein the resolution service fails to return content to the user, identifying a second resolution service to employ to resolve the controlled vocabulary abstract hyperlink and forwarding at least some of the link information to the second resolution service for resolution of the hyperlink.

12. A method for processing user requests, comprising the steps of:
    processing selectively user requests to access information, the selective processing resolving a request generated by a user selection of a controlled vocabulary abstract hyperlink by directing the request to a hyperlink redirection facility, the request including link information associated with the link including an URL address of the hyperlink redirection facility, the hyperlink redirection facility receiving user-supplied information regarding a user contemporaneously with or following the receipt of the link information and prior to any communication being sent to the user soliciting said information, said selective processing further directing a user request originating from a user selection of a hyperlink not including an URL address of the hyperlink redirection facility directly to a requested resource without first directing the request to the hyperlink redirection facility, identifying a resolution service to employ to resolve the controlled vocabulary abstract hyperlink based on the user-supplied information;

forwarding at least some of the link information via the user to the identified resolution service for resolution of the controlled vocabulary abstract hyperlink, identifying a second resolution service to employ to resolve the controlled vocabulary abstract hyperlink based on the user-supplied information and forwarding at least some of the link information via the user to the second resolution service for resolution of the hyperlink where the resolution service fails to return content to the user, and identifying a resolution service that failed to return content to the user in response to the request generated by the user selecting the controlled vocabulary abstract hyperlink, the identifying of the failure taking place before the forwarding of the link information via the user.

13. The method of claim 12, wherein said resource includes content which is divisible into genres and wherein the controlled vocabulary abstract hyperlink contains information regarding to which of the genres the hyperlink is to be resolved.

14. A tangible computer-readable medium having stored thereon computer-executable instructions for processing user requests, the instruction comprising:

instructions for processing selectively a request to access information, the selective processing directing a request originating from a user selection of a controlled vocabulary abstract hyperlink to a hyperlink redirection server, said controlled vocabulary abstract hyperlink including a semantic value and an URL (Uniform Resource Locator) address of the hyperlink redirection server, said semantic value being at least one of a descriptive term and an identifier for the requested information, said hyperlink redirection server being an intermediary performing redirection of said request and having more than one possible target profile for each request said selective processing further directing a user request originating from a user selection of a hyperlink not including an URL of the hyperlink redirection server directly to a requested resource without first directing the request to the hyperlink redirection server;

instructions for receiving at the hyperlink redirection server a communication holding information from the user contemporaneously with or following the receipt of the user request to access information originating from the selection for the controlled vocabulary abstract hyperlink;

instructions for identifying, the identification based on the information in the received communication, a user-supplied preference regarding which service provider to use to service the request, said user-supplied preference being identified at the hyperlink redirection server prior to any communication being sent from the hyperlink redirection server to the user soliciting said preference; and instructions for directing the request originating from the selection of controlled vocabulary abstract hyperlink, from the redirection server via the user to a service provider for servicing the request based on the user-supplied preferences.

15. The medium of claim 14, wherein the instructions further comprise instructions for receiving a communication about the user and using this information to identify the user preference.

16. The medium of claim 15, wherein the communication comprises a cookie.

17. A tangible computer-readable medium having stored thereon computer-executable instructions for processing user requests, the instruction comprising:

instructions for processing selectively user requests to access information, the selective processing resolving a request generated by a user selection of a controlled vocabulary abstract hyperlink by directing the request to a hyperlink redirection facility, the request including the link information associated with the link including an URL (Uniform Resource Locator) address of the hyperlink redirection facility, the hyperlink redirection facility receiving user-supplied information regarding a user contemporaneously with or following the receipt of the link information and prior to any communication being sent from the hyperlink redirection facility to the user soliciting said information, said link information including a URL address of said hyperlink redirection facility, said semantic value being at least one of a descriptive term and an identifier for the resource, said hyperlink redirection facility being an intermediary performing redirection of said request and having more than one possible target profile for each request, said selective processing further directing a user request originating from a user selection of a hyperlink not including an URL address of the hyperlink redirection facility directly to a requested resource without first directing the request to the hyperlink redirection facility;

instructions for identifying a resolution service to employ to resolve the controlled vocabulary abstract hyperlink based on the user information; and instructions for forwarding at least some of the link information associated with the controlled vocabulary abstract hyperlink to the user to for forwarding to the identified resolution service for resolution of the controlled vocabulary abstract hyperlink.

18. The medium of claim 17, wherein instructions further comprise instructions for receiving user information comprises receiving a cookie.

19. The medium of claim 17, wherein the instructions further comprise identifying the resolution service for the request generated in response to the user selecting the controlled vocabulary abstract hyperlink comprises accessing data regarding services available to the user and identifying the resolution service based on services available to the user.

20. In an environment having a redirection facility for redirecting a selected request from a requestor for a given resource to a service provider, a method of advertising, comprising, processing selectively a user request to access a resource, the selective processing directing a selected request originating from a user selection of a controlled vocabulary abstract hyperlink that includes a reference to the redirection facility, the controlled vocabulary abstract hyperlink including a semantic value, said semantic value being at least one of a descriptive term and an identifier for the resource, said redirection facility being an intermediary performing redirection of said request and having more than one possible target profile having information used to resolve each request, said selective processing further directing a user request originating from a user selection of a hyperlink not including a reference to the redirection facility directly to a requested resource without first directing the request to the redirection facility, receiving, at the redirection facility, contemporaneously with or following the receipt of the selected request, a communication from the user containing a user-supplied preference for a service provider to service the request;

modifying said selected request based upon a user-supplied preference, said user-supplied preference being identified at the redirection facility prior to any communication being sent from the redirection facility to the user soliciting said preference;

examining a criterion at the redirection facility;

determining whether to present an advertisement to the requestor based on the examined criterion; and directing the modified selected request from the redirection facility to said user for forwarding to a service provider for servicing of the request.

21. The method of claim 20, wherein the requestor is a user of a computer system.

22. The method of claim 20, wherein the method further comprises the step of presenting an advertisement to the requestor.

23. The method of claim 22, wherein the step of presenting an advertisement comprises sending video content over a network from the redirection facility.

24. The method of claim 23, wherein the step of sending video content comprises sending a web page with an advertisement from the redirection facility to the requestor.

25. The method of claim 20, wherein the criterion is a random criterion so that the determining is based on a random event.

26. The method of claim 20, wherein the criterion is when the requestor last received a previous advertisement from the redirection facility.

27. The method of claim 20, wherein the criterion is how many requests for resources from the requestor have been received at the redirection facility.

28. The method of claim 1 wherein said semantic value is an ISSN number (International Standard Serial Number).

29. The method of claim 7 wherein said semantic value is an ISSN number (International Standard Serial Number).

30. The medium of claim 14 wherein said semantic value is an ISSN number (International Standard Serial Number).

31. The medium of claim 17 wherein said semantic value is an ISSN number (International Standard Serial Number).

* * * * *